US006768906B2

(12) United States Patent
Matthews et al.

(10) Patent No.: US 6,768,906 B2
(45) Date of Patent: *Jul. 27, 2004

(54) SYSTEM AND TECHNIQUE FOR PLANE SWITCHOVER IN AN AIRCRAFT BASED WIRELESS COMMUNICATION SYSTEM

(75) Inventors: Cynthia C. Matthews, Phoenix; Thomas Peter Emmons, Jr., Mesa; Derek A. Oxley, Chandler, all of AZ (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/394,548

(22) Filed: Sep. 13, 1999

(65) Prior Publication Data

US 2002/0049055 A1 Apr. 25, 2002

(51) Int. Cl.[7] ................................................ H04Q 7/00
(52) U.S. Cl. ........................ 455/431; 455/13.1; 455/427; 455/436
(58) Field of Search ................................ 455/431, 422, 455/428, 430, 436, 442, 443, 10, 11.1, 13.1, 12.1

(56) References Cited

U.S. PATENT DOCUMENTS

| | | | |
|---|---|---|---|
| 2,626,348 A | * | 8/1945 | Nobles |
| 2,598,064 A | | 5/1952 | Lindenblad |
| 2,627,021 A | * | 1/1953 | Hansell et al. ............. 455/11.1 |
| 2,748,266 A | * | 5/1956 | Boyd et al. |
| 3,866,227 A | | 2/1975 | Ruvin |
| 5,063,387 A | | 11/1991 | Mower |
| 5,067,172 A | * | 11/1991 | Schloemer |
| 5,123,112 A | * | 6/1992 | Chaote |
| 5,187,805 A | * | 2/1993 | Bertiger et al. |
| 5,455,964 A | | 10/1995 | Roos et al. |

(List continued on next page.)

FOREIGN PATENT DOCUMENTS

| | | |
|---|---|---|
| EP | 0 421 704 A2 | 10/1990 |
| EP | 0 618 704 A1 | 3/1994 |

(List continued on next page.)

OTHER PUBLICATIONS

Relay Aircraft Enable Cell 'Network in the Sky' Aviation Week & Space Technology, 2 pages, Jun. 29, 1998.

(List continued on next page.)

*Primary Examiner*—William Trost
*Assistant Examiner*—Simon Nguyen
(74) *Attorney, Agent, or Firm*—Ingrassia, Fisher & Lorenz

(57) ABSTRACT

An aircraft based communication system (10) defining a wireless service area (20) is disclosed. The communication system (10) includes a communication gateway (30) connected to a terrestrial based communication network. A first aircraft (12) is located in proximity to the wireless service area (20). The first aircraft (12) communicates with the gateway (30) and communicates with at least one subscriber (24) located within the wireless service area (20). The first aircraft (12) transmits a first control signal (16) within the wireless service area (20). A second aircraft (14) is located in proximity to the wireless service area (20). The second aircraft (14) being operable for communicating with the gateway (30) and being operable for communicating with the subscriber (24) located within the wireless service area (20). The second aircraft (14) flies in proximity to the first aircraft (12) for transferring communication sessions (56, 58) from the first aircraft (12) to the second aircraft (14) and maintaining a constant communication link between the subscriber (24) and the terrestrial based communication network.

18 Claims, 6 Drawing Sheets

U.S. PATENT DOCUMENTS

| | | | | |
|---|---|---|---|---|
| 5,479,482 | A | | 12/1995 | Grimes |
| 5,530,909 | A | * | 6/1996 | Simon et al. |
| 5,548,292 | A | * | 8/1996 | Hirschfield et al. |
| 5,557,656 | A | * | 9/1996 | Ray et al. |
| 5,559,865 | A | * | 9/1996 | Gilhousen ........ 455/11.1 |
| 5,574,968 | A | | 11/1996 | Olds et al. |
| 5,619,211 | A | * | 4/1997 | Horkin et al. |
| 5,625,867 | A | * | 4/1997 | Rouffet et al. ........ 455/13.1 |
| 5,657,032 | A | * | 8/1997 | Liechty et al. |
| 5,678,184 | A | | 10/1997 | Cutler, Jr. et al. |
| 5,774,790 | A | | 6/1998 | Dupuy |
| 5,790,939 | A | | 8/1998 | Malcolm et al. |
| 5,832,380 | A | * | 11/1998 | Ray et al. ........ 455/431 |
| 5,890,079 | A | * | 3/1999 | Levine |
| 5,937,349 | A | * | 8/1999 | Andresen |
| 5,974,349 | A | * | 10/1999 | Levine |
| 6,006,084 | A | | 12/1999 | Miller et al. |
| 6,007,758 | A | * | 12/1999 | Fleming et al. |
| 6,018,659 | A | | 1/2000 | Ayyagari et al. |
| 6,061,561 | A | | 5/2000 | Alanara et al. |
| 6,061,562 | A | * | 5/2000 | Martin et al. ........ 455/431 |
| 6,072,428 | A | | 6/2000 | Schipper et al. |
| 6,073,004 | A | | 6/2000 | Balachandran |
| 6,127,946 | A | * | 10/2000 | Tzidon et al. |
| 6,162,263 | A | * | 12/2000 | Day et al. |
| 6,285,878 | B1 | | 9/2001 | Lai |
| 6,324,398 | B1 | | 11/2001 | Lanzerotti et al. |

FOREIGN PATENT DOCUMENTS

| | | |
|---|---|---|
| EP | 0 789 498 | 8/1997 |
| EP | 0 803 742 A2 | 10/1997 |
| EP | 0 837 567 A2 | 10/1997 |
| EP | 0 901 240 | 3/1999 |
| EP | 0 939 569 | 9/1999 |
| FR | 2757331 | 12/1997 |
| GB | 2 320 992 A | 11/1997 |
| GB | 2318948 | 5/1998 |
| JP | 3104426 A2 | 5/1991 |
| WO | WO 95/04407 | 2/1995 |
| WO | WO 96 02094 | 1/1996 |
| WO | WO 96 16489 | 5/1996 |
| WO | WO 97/07609 | 2/1997 |
| WO | WO 97 19525 | 5/1997 |
| WO | WO 97 23104 | 6/1997 |
| WO | WO 98/51568 | 5/1998 |
| WO | WO 98 44639 | 10/1998 |
| WO | WO 99 13598 | 3/1999 |
| WO | WO 99/23769 | 5/1999 |
| WO | WO 99/45609 | 9/1999 |
| WO | WO 99 46877 | 9/1999 |
| WO | WO 00 14902 | 3/2000 |
| WO | WO 01 20719 | 3/2001 |
| WO | WO 01 20814 | 3/2001 |
| WO | WO 01 20815 | 3/2001 |
| WO | WO 01 20943 | 3/2001 |

OTHER PUBLICATIONS

Airborne Relay Communication System—System Demonstration—public handout at public demonstration, 36 pages, May 1, 1998.

Establishing Wireless Communications Services via High–Altitude Aeronautical Platforms: A concept Whose Time Has Come? IEEE Communications Magazine, 8 pages, Sep. 1997.

Concept Overview, Angel Technologies Corporation Web Page printout, (www.angelcorp.com), 7 pages, Mar. 1998.

Hail HALE, the Answers May All Be Here, unmanned Systems Magazine, pp. 31–34, Winter, 1995.

High–Capacity Aerial Vehicles Aid Wireless Communication, Signal Magazine, 6 pages, Apr. 1997.

Geosynchronous Satellites at 14 Miles Altitude?, New Telecom Quarterly, pp. 11–16, Second Quarter, 1995 (2Q95).

"Airborne Relay Communication System"—System Demonstration—public handout at public demonstration, May 1, 1998, 36 pages.

"Concept Overview", Angel Technologies Corporation Web Page Printout, (www.angelcorp.com), Mar. 1998, 7 pages.

"Hail HALE, the Answers May All Be Here", Thomas W. Will, Ph.D., Joseph N. Pelton, Ph.D., Unmanned Systems Magazine, Winter 1995, pp. 31–34.

"High–Capacity Aerial Vehicles Aid Wireless Communications", Signal Magazine, Apr. 1997, 6 pages.

"Geosynchronous Satellites at 14 Miles Altitude?", Joseph N. Pelton, Ph.D., New Telecom Quarterly, Second Quarter 1995 (2Q95), pp. 11–16.

"Revised Technical and Operational Parameters For Typical IMT–2000 Terrestrial Systems Using High Altitude Platform Stations And CDMA Radio Transmission Technologies", Radiocommunication Study Groups, Mar. 4, 1999.*

"On the Use of HALE Platforms as GSM Base Stations", IEEE Personal Communications, Apr. 2001 vol. 8 No. 2.*

"Relay Aircraft Enable Cell 'Network in the Sky'", Aviation Week & Space Technology, Jun. 29, 1998.*

"Skystation Stratospheric Telecommunication New Payload Description", American Institute of Aeronautics and Astronautics, Inc. (AIAA–98–1255, p. 235), Francesco Mini et al.*

"51.84 Mbps Airborne Wireless Experiments: A Prelude to the Emerging HALO Communication Technology", IEEE0–7803–5554–7/99, Jon Aasterud et al.*

"Establishing wireless communications services via high–altitude aeronautical platforms: A concept whose time has come?", Djuknic, Freidenfelds (Lucent), Okuney (DataComm), IEEE Communications Magazine, US, IEEE Service Center. Piscataway, N.J., vol. 35, No. 9, Sep. 1, 1997 (1997–09–01), pp. 128–135.

"Relay Aircraft Enable Cell 'Network in the Sky'", William Scott, Aviation Week and Space Technology, Jun. 29, 1998, pp.22–23.

"Wireless communication system using stratospheric platforms", Hase, Proceedings of SPSW 1999, Sep. 12, 1999, Tokyo, Japan, pp. 1–15.

Patent Abstracts of Japan. vol. 015, No. 295 (E–1094), Jul. 26, 1991 (1991–97–26)–& JP 03 104426 A(Hitomi Shimabad; Others: 01), May 1, 1991 (1991–05–01) abstract.

"Iterative analysis of finite–sized planar frequency–selective surfaces with rectangular patches or perforations using spectral representation," Caster, Raphael, +, T–AP Apr. 1987, p. 372–377.

Frequency–selective surface using aperture–coupled microstrip patches, Pous, Rafael, +, T–AP Dec. 1991, p. 1763–1769.

Numerical analysis of finite frequency–selective surfaces with rectangular patches of various aspect ratios, Grounds, Preston W., =, T–AP May 1991, p. 569–575.

* cited by examiner

10

SYSTEM AND TECHNIQUE FOR PLANE SWITCHOVER IN AN AIRCRAFT BASED WIRELESS COMMUNICATION SYSTEM

BACKGROUND OF THE INVENTION

1. Technical Field

The present invention relates generally to an aircraft based communication system. More particularly, the present invention is directed to a system and technique for implementing plane to plane switchover in an aircraft based wireless communication system.

2. Discussion

The increasing need for wireless networks and communication capabilities in outlying and geographically diverse locations has created great demand for wireless systems and wireless service carriers. Many of these new carriers have understandably focused their resources on building as many towers and installing and commissioning as many terrestrial base stations as possible. This strategy increases the coverage area for the communication services of the system and generates revenue for the wireless system operator at a rate limited by the amount of time necessary to construct and commission these base station facilities. However, the build-out rate for base stations is still slow and expensive.

There exist many geographic regions which do not have wireless communication services implemented through antenna towers and terrestrial base stations. Such areas are often referred to as green field areas. Several options exist for providing wireless communication services to subscribers within these green field areas including but not limited to, installing towers and terrestrial base stations, providing communication service from an aircraft flying overhead, and providing communication service from a satellite constellation.

Aircraft based wireless communication systems are being seriously considered due to their lower investment in capital equipment, and their reduced lead time for complete implementation. Aircraft based wireless communication systems have a significant advantage over antenna tower based terrestrial systems in that a single aircraft and base station can replace many antenna towers and still cover a large geographic area. Moreover, the aircraft can maintain a line of sight communication link with nearly every subscriber within its communication beam coverage area. However, one disadvantage with an aircraft based wireless communication system is that the aircraft can only provide coverage to the service area for a limited amount of time, as most aircraft must be refueled and the flight crew must be changed.

In view of the known challenges with terrestrial based wireless communication systems, it is desirable to provide an aircraft based wireless communication system which eliminates the need for additional and costly terrestrial based antenna systems. It is further desirable to provide an aircraft based wireless communication system which is compatible with existing wireless communication system base transceiver stations. To achieve the above goal, it is desirable to implement a system and technique for executing switchover of the real time communication sessions from one servicing aircraft to another replacement aircraft while both aircraft are in flight. Accordingly, it is an advantage of the present invention to minimize any dropped calls or interruption in service experienced by the ground based system subscribers during execution of the plane to plane switchover protocol.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE PREFERRED EMBODIMENTS

Figure 1:
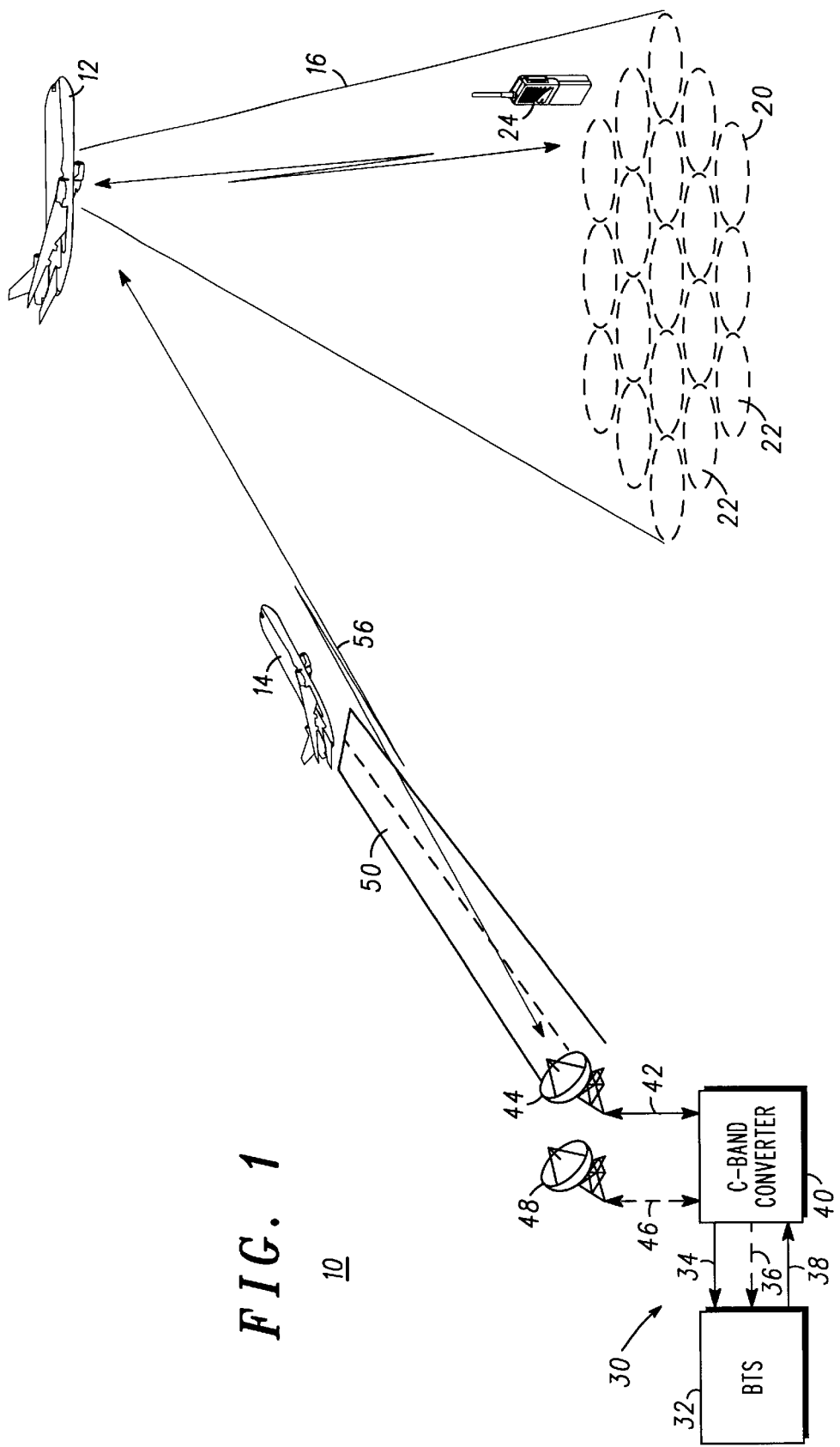
FIG. 1 is a diagram showing the components of the wireless communication system of the present invention during normal steady state operation.

Turning now to FIG. 1, the aircraft based communication system 10 is shown in accordance with a preferred embodiment of the present invention. Communication system 10 is a cellular based communication system, preferably referred to as a wireless communication system. As shown, wireless communication system 10 includes a primary or servicing aircraft 12 which is outfitted with suitable communication hardware for broadcasting a communication signal 16 into a predetermined geographic area 20. Preferably, the communication signal 16 is a wireless communication beam pattern comprising a plurality of precisely focused individual beams 22. The beams 22 may be received by a plurality of wireless communication devices, such as a wireless handset 24.

Figure 2:
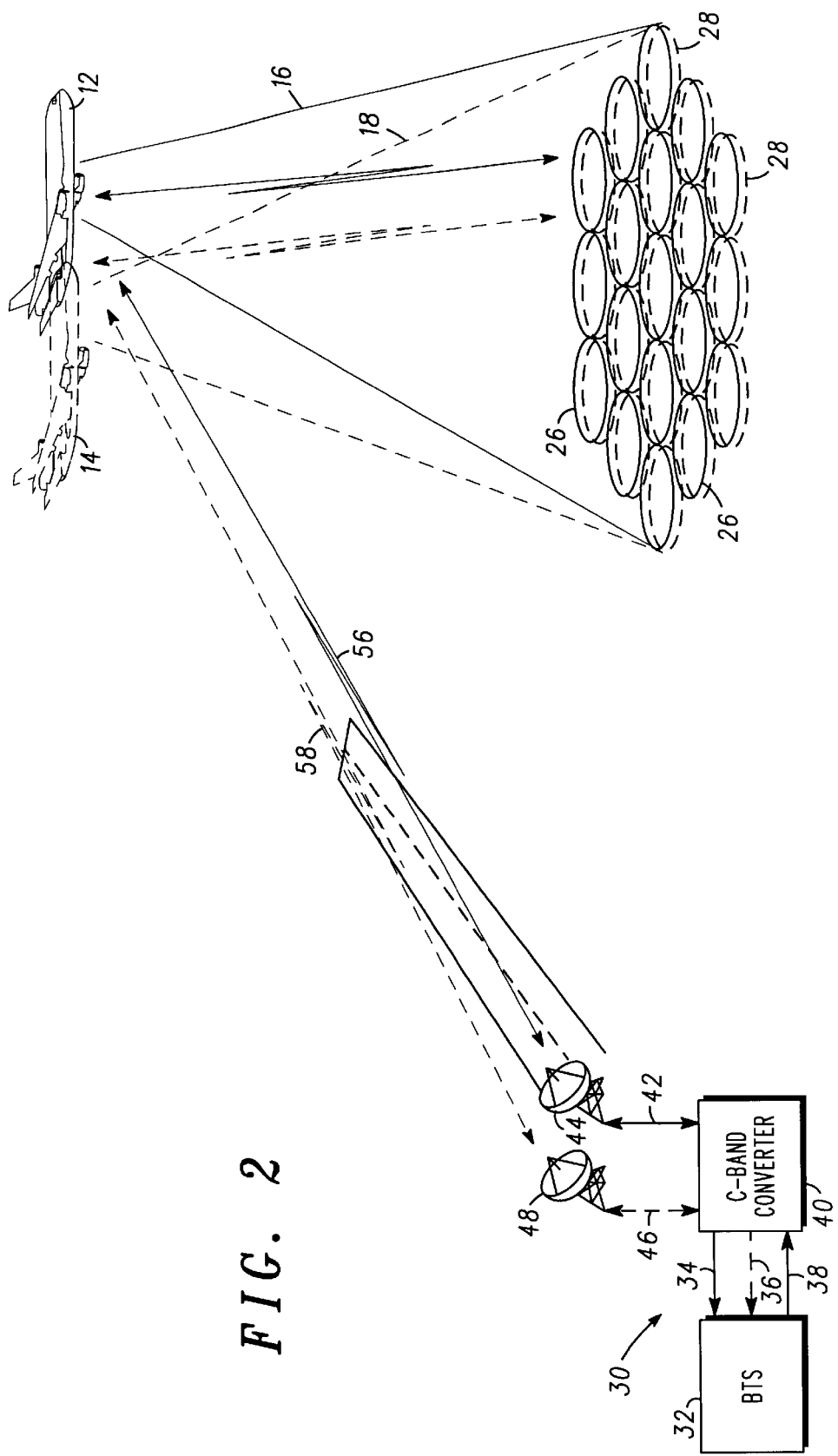
FIG. 2 is a diagram showing the wireless communication system of the present invention during preparation for communication switchover from the servicing aircraft to the replacement aircraft.

With reference to FIG. 2, the communication system 10 also includes a secondary or replacement aircraft 14 which is also capable of broadcasting a communication signal 18 into the predetermined geographic region 20. The communication signal 18 is also preferably a wireless communication beam pattern comprising a plurality of precisely focused individual beams 22, which may also be received by one or more wireless handsets 24. The primary communication signal 16 is shown as a beam pattern of solid circles 26, and the secondary communication signal 18 is shown as a pattern of dotted line circles 28.

Referring now to FIGS. 1 and 2, the ground based communication system 30 represents the existing communication hardware associated with most ground based wireless communication systems. As shown, communication system 30 includes a base transceiver station (BTS) 32 having a main receiver 34, a diversity receiver 36, and a transmitter 38. The BTS 32 functions as a communication gateway between the aircraft 12, 14 and a terrestrial based communication network, such as a public telephone and/or data network. A high speed data converter 40 provides a high speed data link to the aircraft 12, 14. Therefore, high speed data converter receives signals from the transmitter 38 and provides converted signals to the main receiver 34 and diversity receiver 36 of the BTS 32. A variety of data converters can be used with the communication system of the present invention. While a C-band converter is preferred, other converters such as K-band and S-band converters can also be employed.

The C-band converter 40 is also connected via a bi-directional communication path 42 to a primary antenna 44. The C-band converter 40 is also connected via a bi-directional communication link 46 to a secondary antenna 48. While two separate antennas 44, 48 are shown, it is within the scope of the present invention to use a single multiplexed antenna for communicating with the aircraft 12, 14. The ground based communication system 30 is preferably an existing 800 MHz or 1900 MHz wireless communication system operating under either the Is-95 or Is-136 wireless communication standard. While one of the above mentioned wireless systems is preferred, the plane to plane switchover protocol of the present invention can be used with many other types of wireless communication systems and standards.

Figure 6:
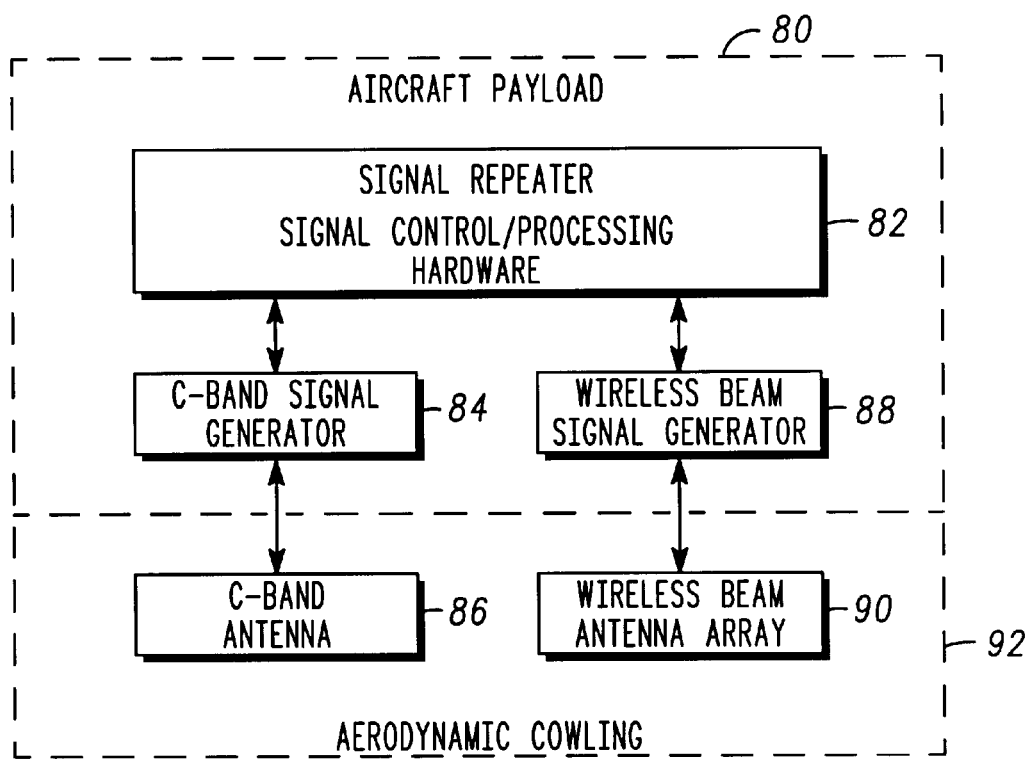
FIG. 6 is a block diagram showing the communication hardware which comprises the payload of each aircraft.

Turning briefly to FIG. 6, the payload 80 of the servicing aircraft 12 is shown in block diagram form. It should be understood that replacement aircraft 14 also includes a similar payload 80. As shown, the communication hardware forming payload 80 includes a signal repeater 82 which further includes signal control and processing hardware. The signal repeater 82 communicates bidirectionally with a C-band signal generator 84 which is connected to a suitable C-band antenna 86. The signal repeater 82 also communicates bidirectionally with a wireless beam signal generator 88 which is connected to a suitable wireless beam antenna array 90. As will be appreciated the C-band antenna 86 communicates with the antennas 44, 48 connected to the ground based C-band converter 40, and the wireless beam antenna array 90 is particularly suited for broadcasting the wireless communication beam patterns 16, 18. Because the C-band antenna 86 and the wireless beam antenna array 90 are mounted externally on each aircraft 12, 14, they are preferably covered by an aerodynamic cowling 92.

With reference to FIG. 1, the steady state operation of communication system 10 will be described in greater detail. During the steady state operation, wireless communication service is provided by a single aircraft such as servicing aircraft 12. It is preferred that the aircraft 12,14 fly over the wireless service area at an altitude of about 30,000 to 50,000 feet. However, one skilled in the art will readily appreciate that the aircraft 12, 14 can fly at a variety of altitudes depending upon the system implementation and aircraft capabilities. During the steady state operation of the wireless communication system, one of the two C-band ground antennas 44, 48 are used for the feeder link 56 between the ground based communication system 30 and the servicing aircraft 12. As shown in FIG. 1, the primary antenna 44 is being used. Also shown is that the replacement aircraft 14 is in transit to the predetermined geographic area 20 from an airport 50. During steady state operation, the BTS 32 is receiving the repeated signal from the servicing aircraft 12 on the main receiver path 34. A wireless service subscriber 24 within geographic area 20 perceives a single RF communication path. Accordingly, an advantage of the present invention is that an existing wireless service subscriber 24 can communicate with the aircraft 12, 14 without any modifications to their wireless telephone or data device. Additionally, the communication hardware carried by the aircraft 12, 14 can communicate with existing terrestrial based telephone and data networks.

Turning now to FIG. 2, the preparation for executing a plane to plane communication switchover protocol is shown. During switchover preparation, the replacement aircraft 14 moves into position along a flight path in proximity to the primary servicing aircraft 12. The replacement aircraft 14 replicates the communication signal 16 transmitted by servicing aircraft 12 as wireless communication beam pattern 18. This communication signal 18 is broadcasted from the replacement aircraft 14 toward the ground at low power, and is broadcasted in such a way that the wireless communication beam pattern 18 substantially overlaps the existing wireless communication beam pattern 16. The overlap between the communication beam patterns 16, 18 is preferably greater than 80%. For example, if the overlap becomes less than 80%, an significant number of subscribers will be required to handoff to a different beam. A goal of the present invention is to minimize the number of handoffs during execution of the plane to plane switchover.

As part of the switchover preparation protocol, both ground antennas 44, 48 are used for transmitting and receiving the feeder link communication signals 56, 58 to/from the aircraft 12, 14. The aircraft 12, 14 function as signal repeaters for communicating between the BTS 32 and the predetermined geographic region 20. The BTS 32 receives a strong signal on the main receiver 34 via the primary antenna 44, and a weaker diffracted signal on the diversity receiver 36 via the secondary antenna 48. During switchover preparation, a wireless subscriber 24 within the geographic region 20 perceives a multipath reception condition because the communication signal 16 and the communication signal 18 are transmitted within a common frequency band. For wireless handsets, such as a CDMA handset, the RAKE receiver internal to the handset functions to resolve the multipath signals. As is known in the art, the RAKE receiver of a CDMA wireless handset has the ability to separate out and receive multipath signals (two signals on the same frequency).

Figure 3:
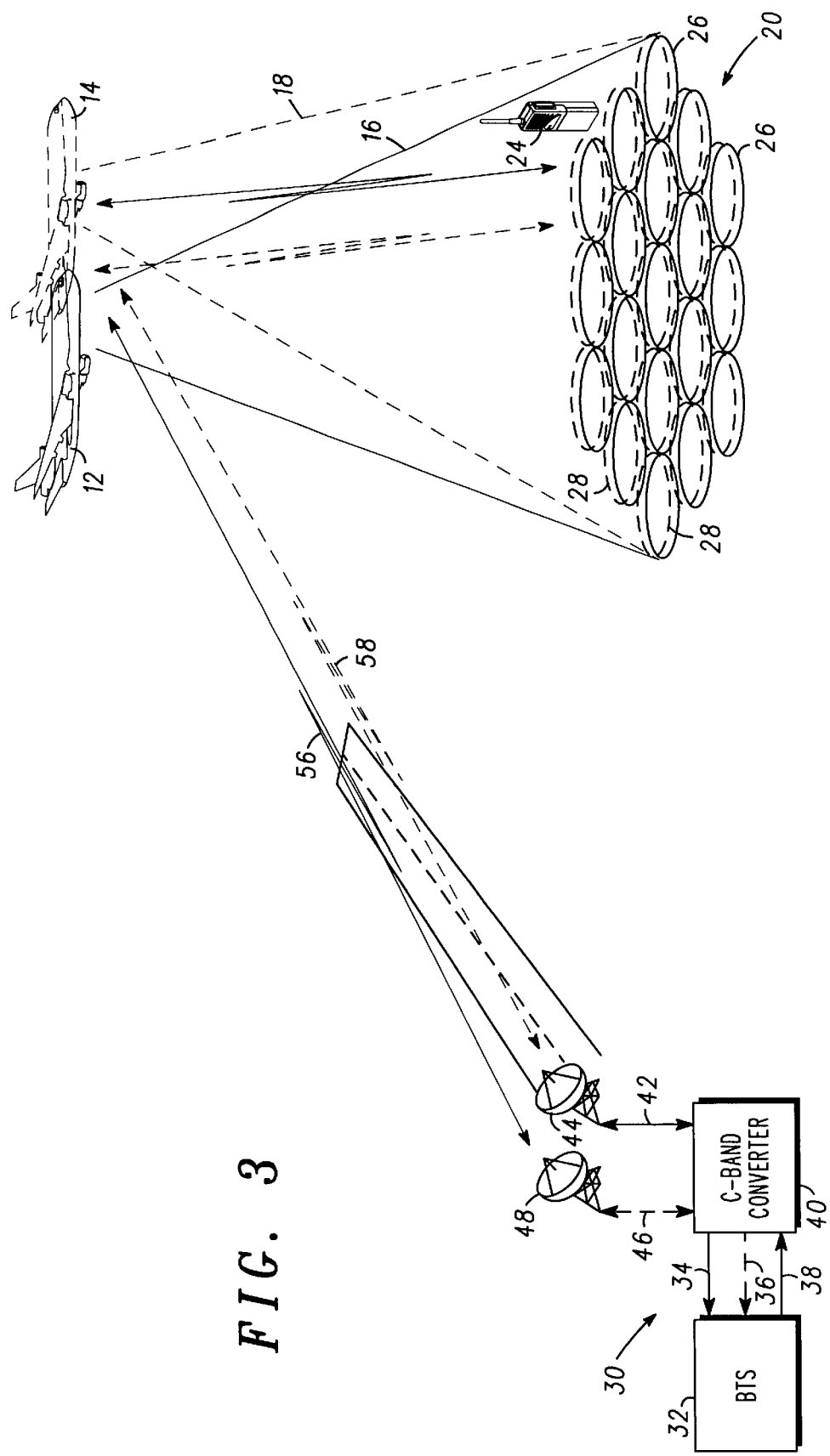
FIG. 3 is a diagram showing the wireless communication system of the present invention during execution of the communication switchover protocol.

Referring to FIG. 3, the switchover execution procedure is shown. During switchover execution, the replacement aircraft 14 increases the power of its control signal 18 up to normal amplitude levels, and the servicing aircraft 12 reduces the power level of its control signal 16 until the control signal can no longer be detected. The power level of the control signal 18 can be increased to its normal operating power level before the power level of the control signal 16 is attenuated. Alternatively, the power level of the control signal 18 can be increased while simultaneously attenuating the power level of the control signal 16. In this context the term control signal refers collectively to voice traffic and control signal information. The power level changes of the control signals can be performed by the hardware carried in each aircraft 12, 14. Alternatively, the power level changes of the control signals can be performed by the ground based C-band converter 40.

At this point, both C-band ground antennas 44, 48 are used for the feeder link, broadcasted to/received from the wireless subscribers 24 within the geographic area 20. It is preferred that the subscriber links from each aircraft 12, 14 to the wireless subscribers 24 are broadcasted at the same frequency, such that they appear to be identical to the subscriber for creating or simulating a multipath condition such that they can be simultaneously received by a single handset receiver. Also at this point, both aircraft are receiving and repeating signals from the wireless subscribers 24 back to the ground antennas 44, 48. Further, both receivers 34, 36 of BTS 32 are receiving the multipath signals from the aircraft 12, 14. As the power of the control signal from the servicing aircraft 12 fades and the power of the control signal from the replacement aircraft 14 increases, the BTS 32 switches reception from the main receiver 34 to the diversity path receiver 36, and the communication sessions are effectively transferred or switched over from the servicing aircraft 12 to the replacement aircraft 14. At this point, there is minimal frequency and timing shift of the control signals received by the BTS 24. Also from the wireless subscriber's view, there is minimal frequency and timing shift of the control signals. More particularly, this means that the plane to plane switchover is transparent to the handset 24, and a wireless subscriber within the predetermined geographic area 20 is unable to perceive the switching from the main receiver 34 to the diversity path receiver 36.

Figure 4:
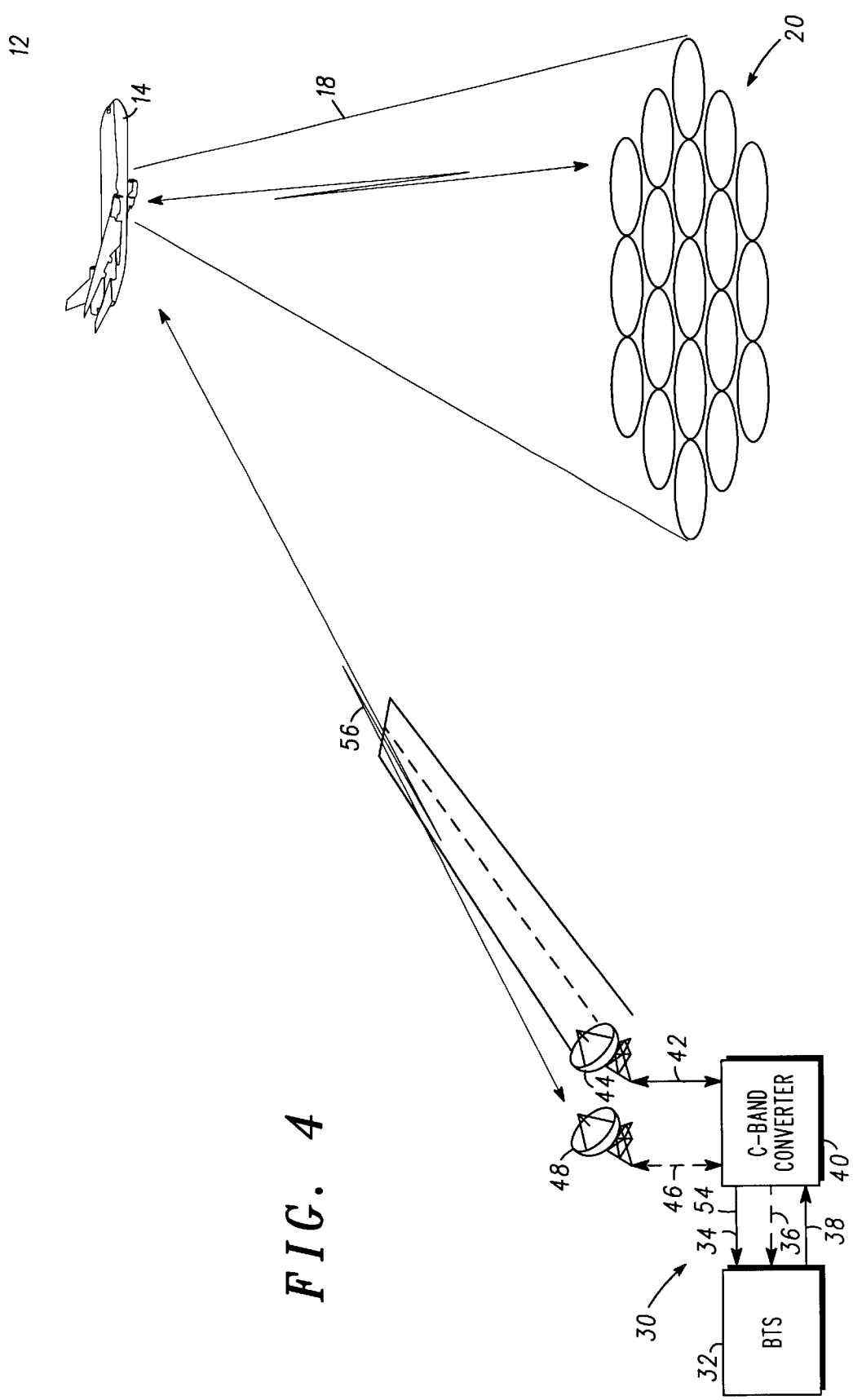
FIG. 4 is a diagram showing the wireless communication system of the present invention after completion of the communication switchover protocol.

Turning now to FIG. 4, completion of the plane to plane communication switchover protocol is shown. After the switchover protocol from the servicing aircraft 12 to the replacement aircraft 14 is complete, the replacement aircraft 14 is then considered the primary servicing and communicating aircraft. At this point, operation once again has the appearance of normal steady state operation. The BTS 32 is receiving the control channel 56 on the secondary antenna 48. After the switchover protocol is complete the BTS 32 can continue receiving signals on the diversity path receiver 36, or as shown, the C-band converter 40 may switch signal reception from the diversity receiver 36 to the main receiver 34. This communication link from the aircraft 14 to the antenna 48 is shown as a solid line 56, and the communication link from the antenna 48 through to the main receiver 34 of the BTS 32 is shown as a dashed line 54. Additionally, as shown responsibility for carrying the feeder link 56 has switched from the primary antenna 44 to the secondary antenna 48.

While the present invention has been described within the context of a two aircraft system, one skilled in the art will readily appreciate that a single aircraft 12 can be used for providing communication service to subscribers 24 within the service area 20. The aircraft 12 is intended to include any type of aircraft capable of maintaining coverage over the service area 20, including but not limited to an unmanned airplane with in-flight refueling capabilities, a dirigible type airship, and a balloon. Additionally, the switchover protocol of the present invention may be made between two different types of aircraft.

Figure 5:
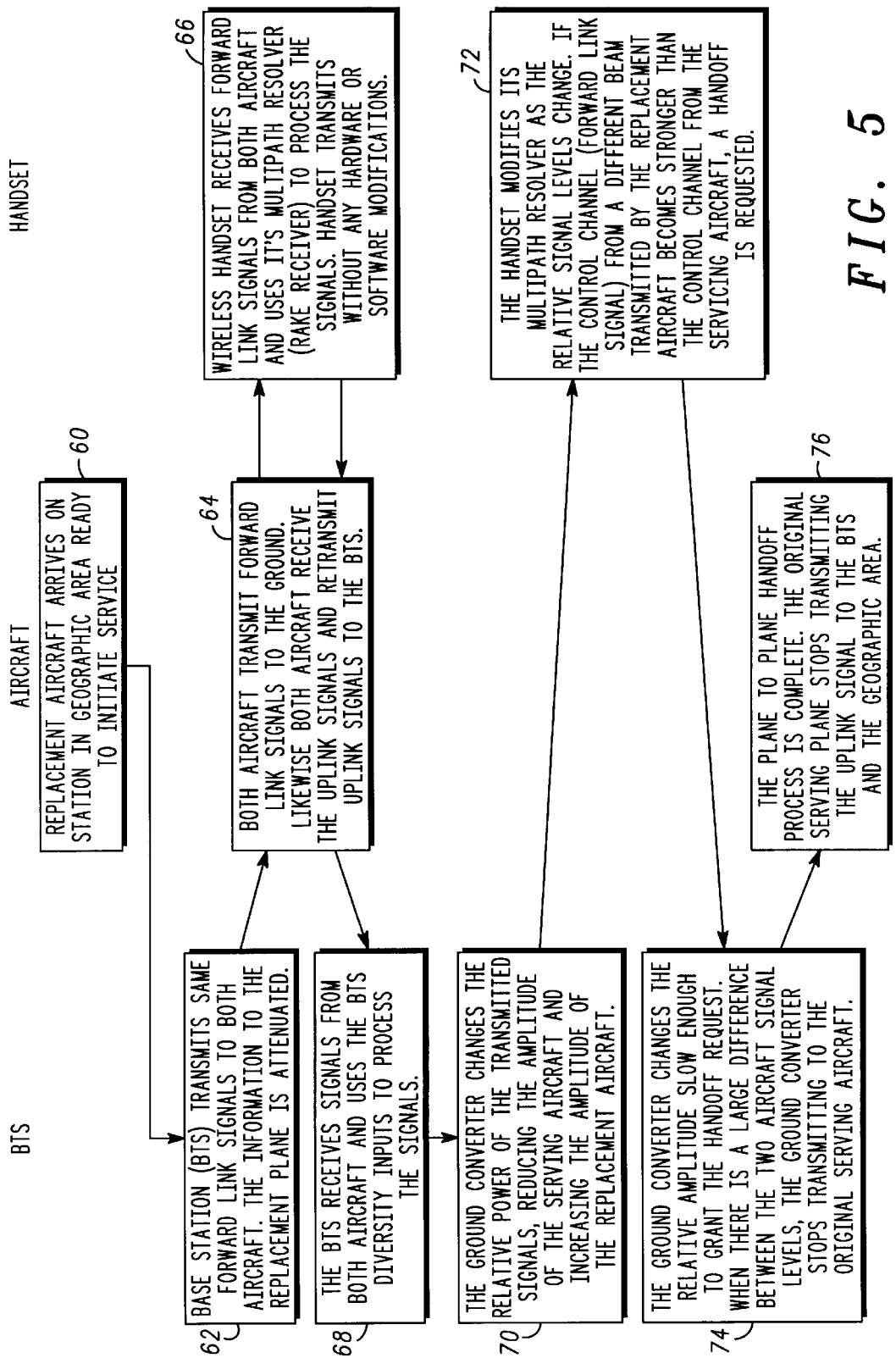
FIG. 5 is a flow diagram showing the steps for executing the communication switchover protocol.

With reference to FIG. 5, the relative timing of the events forming the plane to plane switchover protocol of the present invention are shown. At block 60, the replacement aircraft 14 arrives on station ready to initiate wireless service. At block 62 the BTS 32 transmits the same forward link signals 56, 58 (including control signal information) to both aircraft 12, 14 (respectively). The information to the replacement aircraft 14 is attenuated by the C-band converter 40. At block 64, both aircraft 12, 14 retransmit the forward link signals (or subscriber link signals) into the geographic area 20. Likewise, both aircraft 12, 14 receive the uplink signals from a wireless subscriber and retransmit these signals to the BTS 32. At block 66, the wireless handset 24 receives signals from both aircraft 12, 14 and uses it's multipath resolver (RAKE receiver) to process the signals and resolve the multipath condition. The handset transmits normally, and does not require any modification.

At block 68, the BTS 32 receives signals from both aircraft 12, 14 and uses the BTS diversity inputs 34, 36 to process the signals. At block 70 the C-band converter 40 slowly changes the relative power of the transmitted signals, reducing the amplitude of the signal from the servicing aircraft 12 and increasing the amplitude of the signal from the replacement aircraft 14. Alternatively, changing of the relative power can be handled by the signal control and processing hardware 82 carried by each aircraft 12, 14. Continuing with block 72, the handset modifies its multipath resolver as the relative signal levels change. If the control channel (forward link signal) from a different beam transmitted by the replacement aircraft 14 becomes stronger than the control channel from the servicing aircraft 12, a beam to beam handoff is requested.

At block 74, the ground based C-band converter 40 changes the relative amplitude slow enough to grant the handoff request. Where there is a large difference between the two aircraft signal levels, the converter 40 stops transmitting to the original servicing aircraft 12. Finally at block 76, the plane to plane switchover process is complete. The original servicing aircraft 12 stops transmitting the uplink signal to the BTS 32 and also stops transmitting the forward link signal to the geographic area 20.

The present invention uses diversity inputs on a standard BTS to handle two communication inputs from two separate aircraft. The communication switchover protocol associated with the present invention allows for slowly changing relative powers to the BTS, thus forcing transparent switchovers from the old beam pattern or beam structure to the new beam pattern or beam structure. The communication protocol of the present invention also allows transmission of both signals to the aircraft on different polarizations.

The present invention allows a service provider to rapidly cover a large geographical area without having to deploy multiple base stations across that area. This allows early entry into new markets and easy system expansion after initial deployment. This can be done without any changes to the wireless infrastructure or to the subscriber handset. The present invention provides coverage over a wide geographical area by linking the wireless infrastructure on the ground with a high altitude repeater that is carried on an aircraft. As part of the present invention, a technique is described for minimizing the dropped call impact of a plane to plane switchover in an aircraft based wireless communication system. As set forth above, the technique involves simultaneously transmitting control channels from both planes while changing the relative power (amplitude) levels of the control signals.

The wide-area coverage provided by the present invention saves capital expenses by locating the infrastructure equipment of the wireless communication system in a single center. The service provider does not have to buy any land, buildings, or towers to install hundreds of base transceiver stations (BTSs) to cover the area. Instead, the wireless operator simply installs a mobile switching office and a reduced amount of BTS equipment needed for terrestrial deployment.

The central location of all the wireless infrastructure equipment in the present invention allows the wireless operator to operate and maintain the system with a smaller crew. Moreover, the wireless operator saves all the capital expenses (trucks, test equipment, etc.) and all the recurring costs (personnel to visit the sites) that would be needed to operate and maintain geographically dispersed facilities.

The wireless communication system of the present invention complements a terrestrial coverage by filling up any coverage holes left in the terrestrial deployment and by extending the coverage to suburban and rural areas where site deployment is not economical. In a new system, the present invention provides immediate coverage of the entire service area, compared to the slow rollout of sites that is typical in terrestrial deployments.

The present invention can also provide services for other digital wireless technologies such as Personal Communication Service (PCS) 1900, IS-95 Code Division Multiple Access (CDMA), IS-136 Time Division Multiple Access (TDMA), Global System for Mobiles (GSM) and Integrated Digital Enhanced Network (iDEN). In addition, the present invention can be used for third generation wireless systems such as Universal Mobile Telecommunications System (UMTS) or CDMA-2000 as well as broadband data systems such as Local Multipoint Distribution Systems (LMDS).

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An aircraft based communication system defining a wireless service area comprising:
   a communication gateway connected to a terrestrial based communication network;
   a first aircraft located in proximity to the wireless service area, the first aircraft communicating with the gateway and communicating with at least one subscriber located within the wireless service area, the first aircraft transmitting a first control signal within the wireless service area;
   a second aircraft located in proximity to the wireless service area, the second aircraft operable for communicating with the gateway and operable for communicating with the subscriber located within the wireless service area;
   wherein the second aircraft flies in proximity to the first aircraft for transferring communication sessions from the first aircraft to the second aircraft and maintaining a constant communication link between the subscriber and the terrestrial based communication network, the second aircraft transmits a second control signal within the wireless service area; and
   wherein the beam pattern of the second control signal overlaps the beam pattern of the first control signal by at least 80%.

2. The communication system of claim 1 wherein the second control signal is transmitted to appear identical to the first control signal as perceived by a wireless receiving device.

3. The communication system of claim 1 wherein the first and second control signals are received by a wireless receiving device and the wireless receiving device perceives a multipath condition.

4. The communication system of claim 1 wherein the first control signal and the second control signal are transmitted within a common frequency band.

5. The communication system of claim 1 wherein a power level of the second control signal is increased and a power level of the first control signal is attenuated while the second aircraft flies in proximity to the first aircraft.

6. The communication system of claim 1 wherein the communication gateway provides a communication link between the terrestrial based communication network and the aircraft based communication system.

7. An aircraft based communication system defining a wireless service area comprising:
   a communication gateway connected to a terrestrial based communication network, the communication gateway providing a communication link between the terrestrial based communication network and the aircraft based communication system;
   a first aircraft located in proximity to the wireless service area, the first aircraft having a repeater for communicating with the gateway and communicating with at least one subscriber located within the wireless service area, the first aircraft transmitting a first control signal within the wireless service area;
   a second aircraft located in proximity to the wireless service area, the second aircraft having a repeater operable for communicating with the gateway and operable for communicating with the subscriber located within the wireless service area, the second aircraft transmitting a second control signal within the wireless service area wherein a beam pattern of the second control signal substantially overlaps a beam pattern of the first control signal;
   the second aircraft flying in proximity to the first aircraft while transmitting the second control signal for executing a switchover protocol, wherein a power level of the second control signal is increased and a power level of the first control signal is attenuated during the switchover protocol for transferring communication sessions from the first aircraft to the second aircraft while maintaining an uninterrupted communication link between the subscriber and the terrestrial based communication network; and
   the communication gateway includes a first receiver and a second receiver, the first receiver communicating with the first aircraft and the second receiver communicating with the second aircraft during the switchover protocol.

8. The communication system of claim 7 wherein the first and second control signals are received by a wireless receiving device and the wireless receiving device perceives a multipath condition.

9. The communication system of claim 7 wherein the first control signal and the second control signal are transmitted within a common frequency band.

10. The communication system of claim 7 wherein the switchover protocol is executed by a data converter connected to the communication gateway.

11. The communication system of claim 7 wherein the switchover protocol is executed by communication hardware carried by the first and second aircraft.

12. The communication system of claim 7 wherein the power level of the second control signal is increased to its normal operating power level before the power level of the first control signal is attenuated.

13. The communication system of claim 7 wherein the power level of the second control signal is increased while simultaneously attenuating the power level of the first control signal.

14. The communication system of claim 7 wherein the terrestrial based communication network is a telecommunications network for carrying at least one of voice information and data information.

15. The communication system of claim 7 wherein the beam pattern of the second control signal overlaps the beam pattern of the first control signal by at least 80%.

16. An aircraft based communication system comprising:
   a communication gateway connected to a terrestrial base communication network, the communication gateway providing a communication link between the terrestrial based communication network and the aircraft based communication system;
   a servicing aircraft located above a wireless service area, the aircraft communicating with the gateway and communicating with at least one subscriber located within the wireless service area, the aircraft transmitting a control signal within the service area, the control signal including a plurality of communication beams;
   wherein the servicing aircraft functions as a repeater for repeating communication sessions between the subscriber and the communication gateway for providing communication service between the subscriber and the terrestrial based communication network; and a second aircraft flying in proximity to the servicing aircraft, the second aircraft communicating with the gateway and communicating with at least one subscriber located within the wireless service area, the second aircraft transmitting an alternate control signal within the service area, the alternate control signal including a plurality of communication beams which substantially overlap the control signal transmitted from the servicing aircraft by at least 80%.

17. The communication system of claim 16 wherein the second aircraft operates under control of a switchover protocol for transferring the communication sessions from the servicing aircraft to the second aircraft.

18. A method for executing a communication switchover protocol comprising the steps of:

providing a communication gateway having a transmitter, a first receiver, and a second receiver;

providing a first aircraft based communication repeater, the first aircraft based communication repeater maintaining a first communication link between at least one wireless subscriber and the communication gateway;

providing a second aircraft based communication repeater, the second aircraft based communication repeater operable for maintaining a second communication link between the wireless subscriber and the communication gateway;

broadcasting a first communication signal from the first aircraft based communication repeater at a first power level;

broadcasting a second communication signal from the second aircraft based communication repeater at a second power level, the first power level being greater than the second power level;

increasing power of the second power level and decreasing power of the first power level until the second power level is greater than the first power level;

wherein a communication session associated with the first communication link is transferred to the secondary aircraft based communication repeater; and during the step of broadcasting the second communication signal, the first receiver communicates with the first repeater and the second receiver communicates with the second repeater during the communication switchover protocol.

* * * * *